United States Patent

Tacke et al.

[11] Patent Number: 5,387,402
[45] Date of Patent: Feb. 7, 1995

[54] CONTACT REACTOR FOR A QUASI-ISOTHERMAL CATALYTIC OXIDATION OF SO₂ TO SO₃ AND METHOD OF OPERATING SAME

[75] Inventors: Michael Tacke, Friedrichsdorf; Peter Ahrens, Seligenstadt; Hugo Grimm, Miltenberg; Heinz Neumann, Bad König; Egon Winkler, Schwalbach; Arend Werner, Bad Dürkheim; Walter Beitelschmidt; Bruno Triebskorn, both of Ludwigshafen, all of Germany

[73] Assignees: Metallgesellschaft AG, Frankfurt am Main; BASF Aktiengesellschaft, Ludwigshafen, both of Germany

[21] Appl. No.: 66,301

[22] Filed: May 21, 1993

[30] Foreign Application Priority Data

May 26, 1992 [DE] Germany ............... 4217317

[51] Int. Cl.⁶ ............... F28D 7/00; F01N 3/10; B01D 50/00
[52] U.S. Cl. ............... 422/201; 422/173; 422/177; 422/200; 34/578
[58] Field of Search ............... 422/173, 177, 181, 190, 422/200, 201, 211, 213, 216, 262; 165/172, 177; 34/577, 578

[56] References Cited

U.S. PATENT DOCUMENTS

| 2,148,545 | 2/1939 | Dorndorf et al. | 422/201 |
| 2,193,816 | 3/1940 | Houdry | 422/201 |
| 2,458,412 | 1/1949 | Payne | 422/200 |
| 2,548,295 | 4/1951 | Fahnestock | 422/201 |
| 2,625,467 | 1/1953 | Barker | 422/201 |
| 3,462,850 | 8/1969 | Galer | 422/201 |
| 3,893,927 | 10/1976 | Steever et al. | 422/201 |
| 4,420,462 | 12/1983 | Clyde | 422/190 |
| 4,594,227 | 6/1986 | Ohsaki et al. | 422/190 |
| 4,851,197 | 7/1989 | Sturm | 422/173 |
| 4,985,203 | 1/1991 | Tabak | 422/190 |

Primary Examiner—Robert J. Warden
Assistant Examiner—Christopher Y. Kim
Attorney, Agent, or Firm—Herbert Dubno

[57] ABSTRACT

To effect a quasi-isothermal catalytic reaction of SO₂ to SO₃, a plurality of consecutive rows of banks of cooling tubes, are provided in the bed of shaped catalyst bodies in a contact reactor in such a manner that the banks of succeeding rows are staggered from the banks of the preceding rows. The distance between the cooling tubes in the banks is so selected that a penetration of entire catalyst bodies into the banks will virtually be prevented. The banks are so designed that the pressure drop of the gas in the banks is approximately the same as the pressure drop in the layer of catalyst between the bank. The distance between the banks is larger than the width of the banks.

9 Claims, 3 Drawing Sheets

CONTACT REACTOR FOR A QUASI-ISOTHERMAL CATALYTIC OXIDATION OF SO$_2$ TO SO$_3$ AND METHOD OF OPERATING SAME

FIELD OF THE INVENTION

Our present invention relates to a contact reactor for a quasi-isothermal oxidation of SO$_2$ to SO$_3$ in SO$_2$-containing gases. More particularly the invention relates to a reactor of the type which comprises a reactor vessel that contains a bed of shaped catalyst bodies and is provided at one end with a gas inlet and at the other end with a gas outlet and further contains cooling elements (e.g. pipes, tubes or the like) in the bed of catalyst.

BACKGROUND OF THE INVENTION

In conventional plants for producing sulfuric acid, SO$_2$ is catalytically reacted to SO$_3$ in contact reactors which contains 3 to 5 separate contacting trays of V$_2$O$_3$-containing catalyst.

The SO$_2$-containing gas includes about 2 to 12% by volume SO$_2$ and has a corresponding oxygen content and is fed to the first contacting tray at a temperature of about 400° to 460° C.

Because the reaction SO$_2$+0.5O$_2$→SO$_3$ is exothermic the temperature of the gas which has traversed each contacting tray is higher than the corresponding inlet temperature. As the reaction is reversible and the temperature rise causes the equilibrium to shift to the SO$_2$ side, the gas must be cooled before it enters the next following contacting tray although the temperature must not be decreased below the activating temperature of the catalyst. The activating temperature is about 380° C.

The cooling of the gases between the contacting trays is effected by an indirect heat exchange in heat exchangers. To achieve good conversion, the overall adiabatic process must be carried out in a plurality of contacting trays in association with interstage heat exchangers and gas lines.

It has also been proposed to effect the reaction isothermally or quasi-isothermally.

Compared with catalyst in trays, catalyst in tubes affords the advantage that the reaction is quasi-isothermal. These systems have, however, certain significant disadvantages. Firstly an effective dissipation of heat from the catalyst will not be permitted unless the tube is small in diameter so that a large number of tubes will be required even in plants having a low capacity. Secondly, with small diameter tubes it is difficult to fill the tubes with the catalyst bodies and to replace the catalyst. Finally it is difficult to effect a controlled distribution of the gas.

For these reasons such catalysts in tubes have not been used in practice for a considerable time.

In Published German Application 33 18 098 it is suggested to provide an annular bed of catalyst bodies between a gas-permeable outer wall and a gas-permeable inner wall, which constitutes a central tube. The gas flows radially through the catalyst and is withdrawn from the central tube. Individual cooling tubes, which are parallel to the central tube, are arranged in the bed of catalyst. The distances between the cooling tubes in the direction of flow of the gas may be different so that the establishment of a desired temperature profile is possible. However it is not possible to effect an independent control of the temperature profile in the vertical and radial directions.

U.S. Pat. No. 1,685,672 discloses catalyst in tubes and a contacting tray provided with vertically spaced apart rows of individual horizontal cooling tubes, which extend through the wall of the contact reactor and are connected each to a manifold for supplying the coolant and to a manifold for withdrawing the coolant.

The temperature in the tray is influenced either by providing that the distances between the rows of cooling tubes decrease in the direction of flow of the gas or, if the rows are spaced at uniform distances apart, by throttling the flow of coolant by providing plugs in the cooling tubes of those rows which are nearer to the gas outlet. For an effective and uniform cooling over the cross-section of the catalyst a large number of closely spaced apart tubes would be required in each row, but this would render the filling and emptying more difficult. Nevertheless a control in the horizontal and vertical directions would be possible during operation only to a highly restricted degree.

OBJECTS OF THE INVENTION

It is an object of the invention to provide an improved contact reactor and a method of operating the reactor which permit a quasi-isothermal reaction of SO$_2$ to SO$_3$ with a high conversion and in a manner which permits an effective automatic control and a simple filling of the reactor with catalyst bodies and a simple removal of the catalyst bodies.

Another object is to overcome drawbacks of earlier reactors for converting SO$_2$ to SO$_3$ in an SO$_2$-containing gas.

SUMMARY OF THE INVENTION

These objects are accomplished by the provision of a contact reactor for a quasi-isothermal catalytic reaction of SO2 to SO$_3$ in SO$_2$-containing gases, which reactor consists of a reactor vessel that contains a bed of shaped catalyst bodies and is provided with a gas inlet at one end and a gas outlet at the other end and contains cooling elements in the bed of catalyst.

According to the invention:

a) banks of cooling tubes (forming the aforesaid cooling elements) are arranged in a plurality of consecutive rows in such a manner that the banks of a succeeding row register with the spaces between the banks of the next preceding row, i.e. in an imbricating pattern;

b) the spacing of the cooling tubes in the banks is so selected that a penetration of entire bodies of catalyst into the banks will virtually be prevented (so that the catalyst bodies are excluded from the interiors of the banks of cooling tubes).

c) the banks are so designed that the pressure drop of the gas in each bank is approximately the same as the pressure drop in the bed of catalyst between the banks, and d) the distance between adjacent banks in each row does not exceed the width of the banks in the direction of flow of the gas.

The contact reactor may be vertical or horizontal. The form of the banks is so selected that the catalyst as it is charged will trickle from the banks into the spaces between the banks and that no catalyst will remain on the banks as the catalyst is removed. The catalyst bodies may be of pellet, briquette, ring, saddle, cylinder, prism or other shape.

Particularly suitable forms of the banks are a diamond shape, a polygonal shape tapering to a point or a round shape. The spacing of the cooling tubes in each bank will depend on the size of the particles of the catalyst. That spacing is usually below about 10 mm.

The tube banks and the bed of catalyst are so arranged in the cross section of flow of the contact reactor that the resistance opposing the flow of the reaction gas is approximately uniform throughout the cross-section, which means that the flow rates of the gas in the tube banks and in the bed of catalyst between the tube banks are equal or approximately equal. The required distribution and design of the several tube banks is determined by calculation or empirically.

The cooling fluid may consist of $SO_2$-containing gas, $SO_3$-containing gas, air or steam. Different cooling fluids may be conducted through different rows or pairs of rows. The cooling fluid is conducted in a cross flow pattern or in a cross-counterflow pattern or entirely or partly in a cross cocurrent flow pattern relative to the reaction gas.

The inlet temperatures of the cooling fluid are so selected that the reaction gas will not be cooled below the reaction temperature which is required for the catalyst.

The volume flow rate of the cooling fluid is controlled in dependence on the heat of reaction to be dissipated, the outlet temperature desired for the cooling fluid, and the temperature desired for the reaction gas.

Owing to the arrangement and design of the banks of cooling tubes a part of the $SO_2$-containing gas flows in a part of the cross-section of the contact reactor through a catalyst bed having a certain height and in the next succeeding row flows subsequently through a tube bank, by which that part of the gas is cooled before it flows through a bed of catalyst again. At least four rows of tube banks are preferably provided and consecutive ones of said rows are staggered in the direction of flow of the gas.

The inside diameter of the tubes can be 2 to 5 cm and particularly 2 to 3.3 cm. The rows of banks of cooling tubes may be arranged in pairs and in that case the spacing of the rows of consecutive pairs may be different. The spacing of the banks of cooling tubes of the several pairs may also differ.

The advantage afforded by the invention resides in that the temperature can be effectively and uniformly be controlled over the cross-section and over the height of the bed of catalyst so that an effective, quasi-isothermal reaction can be effected and a one-tray reactor can be used to effect a conversion of $SO_2$ to $SO_3$ for which at least three contacting trays would be required in a conventional contact reactor. As a result, an optimum conversion is effected in a highly compact apparatus. No problems arise in the charging and emptying of the contact reactor.

According to a preferred feature the banks of cooling tubes are rhombic or round in shape (seen in cross section perpendicular to the tubes of the bank). That shape is particularly desirable for an effective cooling and for the charging and removal of catalyst into and from the contact reactor.

According to another preferred feature the banks of cooling tubes provided on the wall of the contact reactor in alternating rows consist of half banks or deflecting plates are provided so that a uniform temperature profile will be achieved also at the wall of the reactor.

In still a further preferred feature the banks of cooling tubes in the rows are spaced 10 to 50 cm, preferably 12 to 20 cm, apart. Such spacing will result in particularly good cooling conditions for a quasi isothermal operation.

The rows of banks of cooling tubes can be spaced 1.5 to 5 cm, preferably 2 to 3 cm, apart. Such spacing will result in particularly good cooling conditions.

A layer of catalyst is preferably provided before or upstream of that row of banks of cooling tubes which is the first row in the gas flow path. That layer has a height of about 10 to 20 cm. That layer of catalyst will cause the gas stream to be heated before it flows through the first row of banks of cooling tubes.

According to a preferred feature a layer of catalyst is provided behind or downstream of that row of banks of cooling tubes which is the last row in the gas flow path. That layer has a height of about 10 to 30 cm and serves to provide a more uniform temperature in the exiting gas stream.

In the method provided in accordance with the invention for operating the contact reactor, the $SO_2$-containing gas is at a temperature from 380° to 470° C. as it enters the contact reactor and at a temperature from 400° to 480° C., preferably from 420° to 460° C., as it is withdrawn from the reactor. An effective quasi-isothermal reaction can be effected at these temperatures.

According to a preferred feature the contact reactor is operated as a first stage of a double-absorber system, the exiting gas is processed in an interstage absorber to remove $SO_3$ and is subsequently supplied to a second conversion stage, which comprises a convention contacting tray, and the gas leaving that stage is processed in a final absorber to remove $SO_3$. That mode of operation will result in an optimum total conversion of $SO_2$ to $SO_3$ in a very compact plant.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
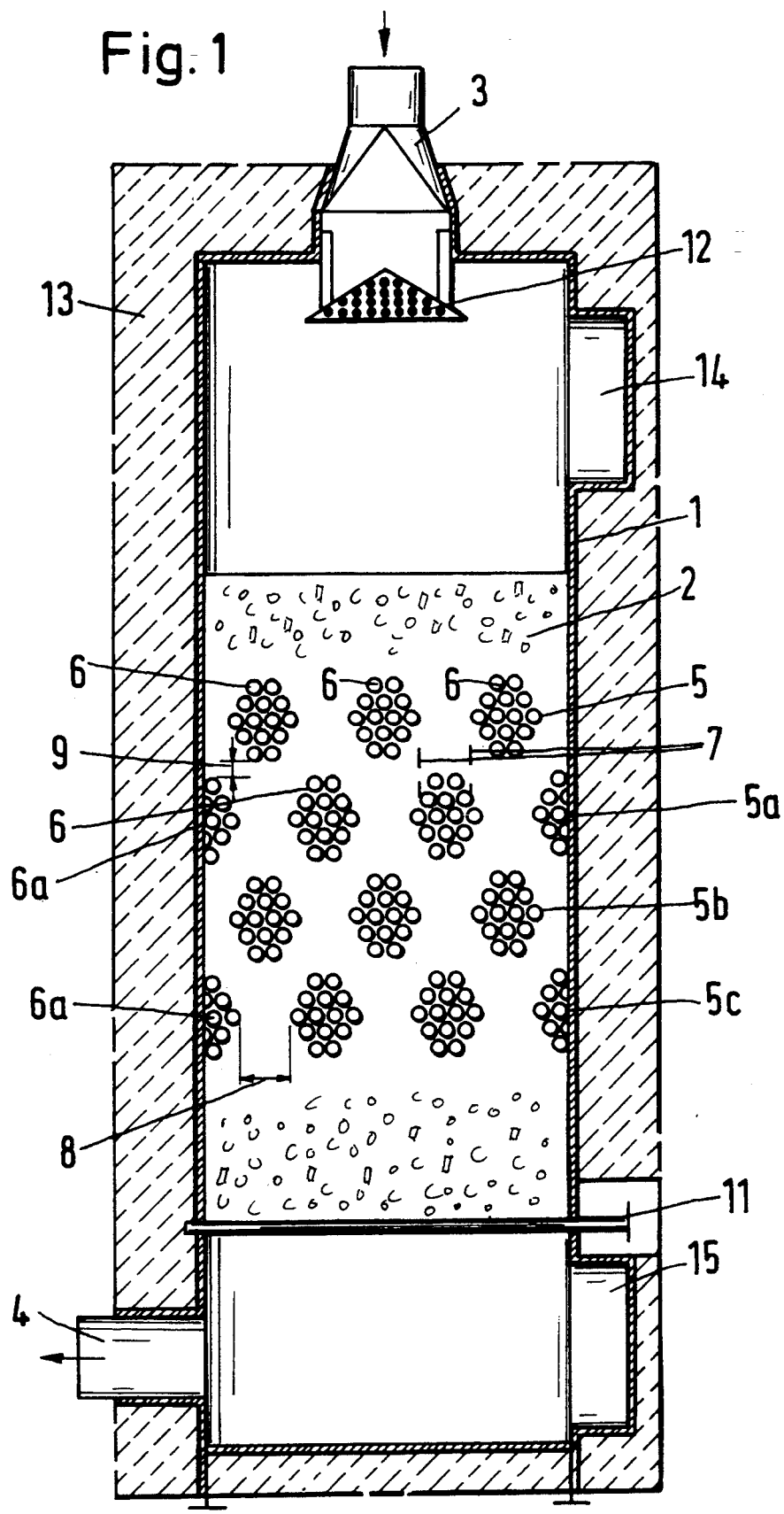
FIG. 1 is a longitudinal sectional view showing a contact reactor which comprises four rows of diamond-shaped banks of cooling tubes, the view being taken on a plane which is at right angles to the banks of cooling tubes.

The reactor 1 contains a bed 2 of catalyst bodies. For the sake of clearness, the bed of catalyst between the banks of cooling tubes is not indicated but will be understood to be present.

The reactor 1 is provided at its top end with a gas inlet 3 and at the bottom end with a gas outlet 4. Four rows 5, 5a, 5b, 5c of banks 6 of cooling tubes are provided in the bed of catalyst as the cooling means.

The banks 6 of row 5a are staggered relative to the banks 6 of the row 5 and register with the spaces between the banks 6 of row 5. The spaces are defined by tangents 7, which extend in the direction of flow of the gas and run vertically from the outermost tubes of adjacent banks 6 of row 5. The banks 6 of rows 5b and 5c are similarly arranged.

Adjacent banks in a row are spaced apart by a distance 8 which is less than the width of the banks seen in the direction of flow of the gas. The rows 5, 5a, 5b, and 5c of the banks 6 of the cooling tubes are spaced a distance 9 apart.

In rows 5a and 5c, half-banks 6a are provided at the wall of the reactor 1.

The bed of catalyst 2 rests on the gas-permeable bottom 10. That bottom consists of two halves, which are held together by the bolt 11. As the bolt 11 is pulled out, the two halves of the bottom 10 swing down, as is indicated by broken lines in FIG. 2, and the bed of catalyst then slips down and can be removed from the reactor.

The gas inlet 3 is provided with a gas-permeable distributer 12. The reactor 1 is surrounded by an insulating layer 13.

The reactor 1 is provided at its top end with a charging opening 14 and at its bottom end with an outlet opening 15 for the catalyst 2.

Figure 2:
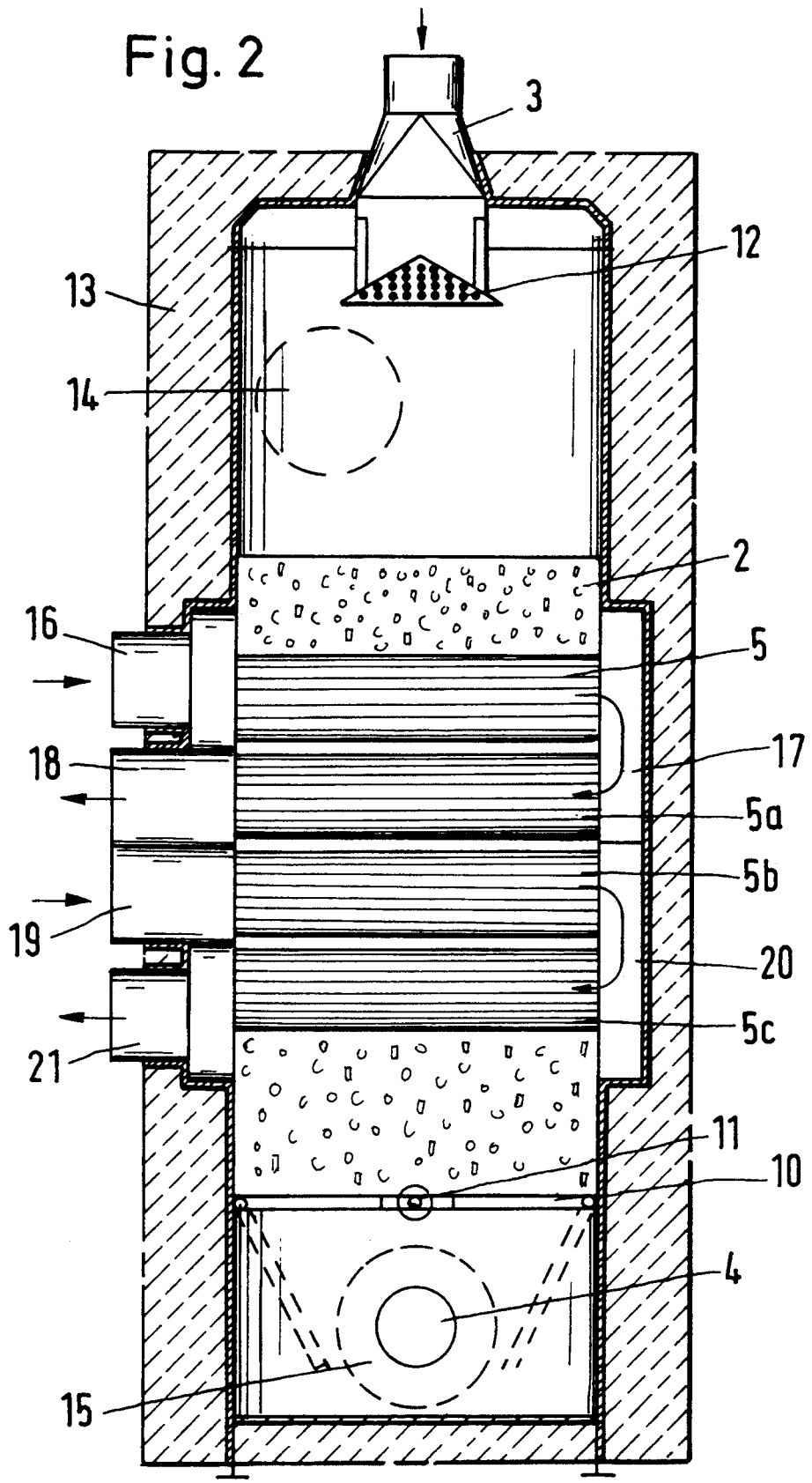
FIG. 2 is a longitudinal sectional view showing the contact reactor and is taken on a plane that is parallel to the banks of cooling tubes.

In FIG. 2 the banks of cooling tubes of rows 5, 5a, 5b, 5c are indicated only by their top and bottom boundary lines. The cooling fluid flows in a cross-counterflow pattern relative to the gas through the inlet 16 and the tubes of the banks 6 of row 5 into the deflecting space 17 and further through the tubes of banks 6 of row 5a into the outlet 18. Cooling fluid flows through the inlet 19 and the tubes of the banks of row 5b into the deflecting space 20 and further through the tubes of banks of row 5c into the outlet 21.

Figure 3:
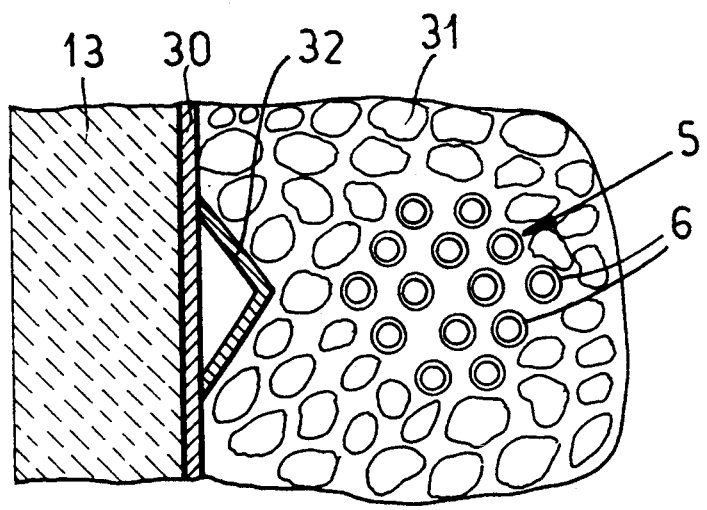
FIG. 3 is a detail section illustrating a modification in which a bank of cooling tubes along a wall of the vessel is replaced by a baffle plate in place of a half bank of the cooling tubes.

As can be seen from FIG. 3, along one of the walls 30 of the vessel within the bed made up of the catalyst bodies 31, along a row 5a of the banks 6 of the cooling tubes, in place of a half bank 6a, a baffle plate 32 can be provided. From FIG. 3 as well it will be apparent that the catalyst bodies 31 are dimensioned so that they cannot pass into the interior of the bank of the cooling tubes.

Figure 4:
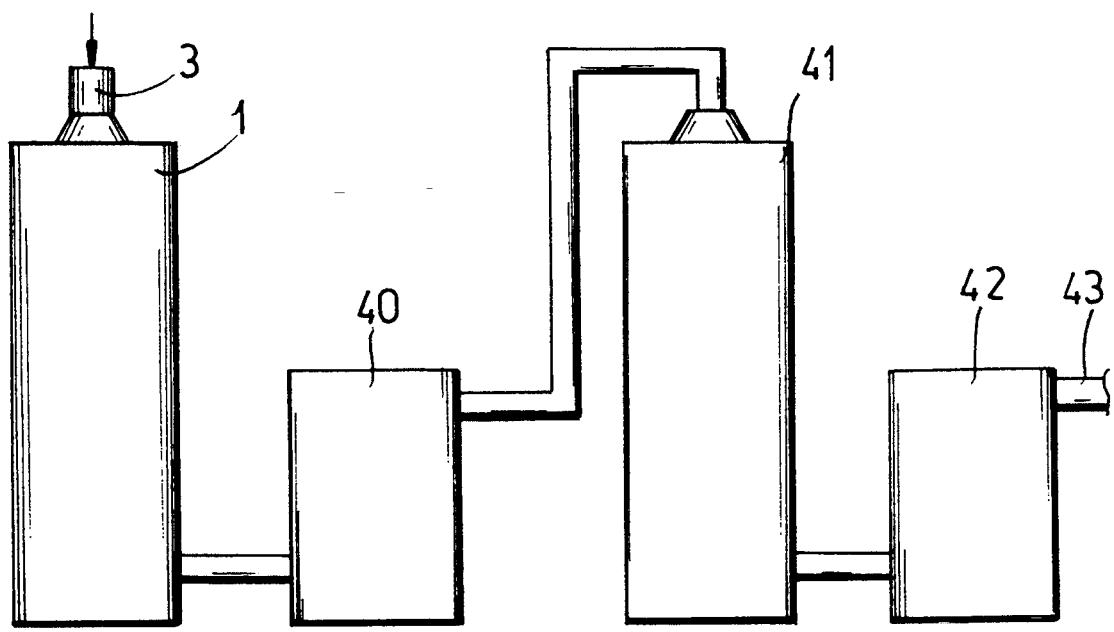
FIG. 4 is a flow diagram illustrating an aspect of the method.

From FIG. 4 it will be apparent that the $SO_2$ containing gas can be fed to the inlet 3 of the reactor vessel 1 which can be connected to an interstage absorber 40 from which the gas can be passed through a conventional catalytic bed 41 and then through a second or final absorber 42 before being discharged at 43. The acid circulations of the absorbers 40 and 42 have not been shown in FIG. 4.

By way of an example, the vertical contact reactor can have a rectangular base area of 600×1000 mm and an overall height of 2500 mm. It can contain 10 entire banks of cooling tubes comprising 14 cooling tubes each and 4 half-banks of 6 tubes each. The banks are arranged in 4 staggered rows, which extend parallel to the long base edge of the reactor. The heat transfer surface area corresponding to the outside diameter of the tubes can amount to 127 m². About 500 liters of catalyst were charged. $SO_2$-containing gases having $SO_2$ concentrations between 7 and 10% $SO_2$ by volume were processed at a rate of 315 to 500 sm³/h (sm³=standard cubic meter—m³ STP). The entering gases were at temperatures between 410° and 490° C. Cooling air was conducted as a cooling fluid through the tubes of the banks. One stream of cooling air was conducted through the two upper rows of banks of cooling tubes in a cross-current flow pattern relative to the gas stream and a second stream of cooling air was conducted through the two lower rows also in a cross-cocurrent flow pattern.

| RESULTS | TEST 1 | TEST 2 | TEST 3 | TEST 4 |
|---|---|---|---|---|
| $SO_2$-CONTAINING GAS (sm³/h) | 315 | 400 | 500 | 600 |
| $SO_2$-CONCENTRATION (VOL. %) | 10.0 | 10.0 | 10.0 | 7.0 |
| INLET TEMPERATURE OF THE $SO_2$-CONTAINING GAS (°C.) | 420 | 415 | 445 | 442 |
| EXIT TEMPERATURE OF THE $SO_3$-CONTAINING GAS (°C.) | 445 | 450 | 490 | 460 |
| CONVERSION OF $SO_2$ (%) | 94.5 | 91.0 | 90.0 | 95.9 |

We claim:
1. A contact reactor for a quasi-isothermal conversion of $SO_2$ in an $SO_2$-containing gas to $SO_3$, said apparatus comprising:
   an elongated reactor vessel;
   means forming a gas inlet at one end of said vessel and a gas outlet at an opposite end of said vessel whereby an $SO_2$-containing gas traverses said vessel from said one end to said opposite end in a flow direction;
   a bed of catalyst bodies in said vessel between said inlet and said outlet and traversed by said $SO_2$-containing gas and capable of reacting $SO_2$ to $SO_3$; and
   a plurality of spaced-apart banks of cooling tubes in said bed and traversed by a cooling fluid, said banks:
   being arranged in a plurality of consecutive rows in said direction with the banks being offset from row to row so that banks of one row register with spaces between banks of a next preceding row and with the rows spaced apart by 1.5 to 5 centimeters,
   being spaced apart by 10 to 50 centimeters in each row,
   having a mutual spacing of tubes preventing penetration of said bodies into interiors of said banks,
   having a gas pressure drop of said $SO_2$-containing gas traversing said banks which is approximately the same as a pressure drop in said bed between said banks, and
   having a spacing between neighboring banks of each row which does not exceed a width of the banks in said direction.
2. The reactor defined in claim 1 wherein said banks of cooling tubes are substantially of a polygonal cross section.
3. The reactor defined in claims 1 wherein said banks are substantially diamond shape in cross section.
4. The reactor defined in claim 1 wherein said banks are substantially of a round shape.
5. The reactor defined in claim 1 wherein along a wall of said vessel, said banks are provided as half banks.
6. The reactor defined in claim 1 wherein along a wall of said vessel deflecting plates are provided.
7. The reactor defined in claim 1 wherein said banks of each row are spaced apart by 12 to 20 centimeters and the rows of banks are spaced apart by 2 to 3 centimeters.

8. The reactor defined in claim 1, further comprising a layer of said catalyst bodies of said bed upstream of a first of said rows of banks in said direction.

9. The reactor defined in claim 1, further comprising a layer of said catalyst bodies of said bed provided downstream of a last of said rows of banks in said direction.

* * * * *